United States Patent [19]

Pizzi

[11] Patent Number: 5,226,216

[45] Date of Patent: Jul. 13, 1993

[54] METHOD AND APPARATUS FOR A CABLE CLAMP ASSEMBLY

[75] Inventor: William M. Pizzi, Elmhurst, Ill.

[73] Assignee: MacLean-Fogg Company, Mundelein, Ill.

[21] Appl. No.: 837,471

[22] Filed: Feb. 18, 1992

[51] Int. Cl.[5] .............................................. F16G 11/00
[52] U.S. Cl. ................................. 24/136 R; 24/115 M; 24/129 A; 403/35.3
[58] Field of Search ............ 24/136 R, 129 R, 115 M; 403/353, 213, 215

[56] References Cited

U.S. PATENT DOCUMENTS

| | | |
|---|---|---|
| 1,948,845 | 9/1932 | DeRight . |
| 2,239,258 | 6/1940 | Tallman . |
| 2,591,925 | 4/1952 | Erbe .................... 403/353 |
| 2,781,212 | 2/1957 | Jugle . |
| 3,066,371 | 12/1962 | Mullens ................. 403/353 |
| 3,095,223 | 6/1963 | Hubbard et al. ........... 24/136 R |
| 4,461,059 | 7/1984 | Bury . |
| 4,542,562 | 9/1985 | Okura . |
| 4,592,117 | 1/1986 | Ruehl et al. . |
| 4,637,098 | 1/1987 | Okura et al. . |
| 4,850,084 | 7/1989 | Iwasaki ................. 403/353 |
| 4,939,821 | 7/1990 | Frank, Jr. . |
| 5,050,273 | 9/1991 | Okura . |

FOREIGN PATENT DOCUMENTS

2461383 3/1981 France ................ 24/136 R

Primary Examiner—Victor N. Sakran
Attorney, Agent, or Firm—Mason, Kolehmainen, Rathburn & Wyss

[57] ABSTRACT

A clamp assembly with a releasable bail for securing and suspending cables, drop wires or the like that utilizes a locking structure cooperating with an aperture in a tail of the clamp assembly to secure and lock the releasable free end of the bail to the clamp assembly. Preferably, the locking structure is a foot segment and head at the end of a leg of the bail with a reduced portion permitting passage of the foot segment from an entry portion along a connecting portion to locate the head at a lock portion. Additionally, the other leg of the bail can be slideably attached utilizing an interlocking structure that reduces bail deformations during installation. Furthermore, the present invention provides a method for assembling the cable clamp assembly wherein the first and second legs are assembled and attached to the tail, and also providing a method for simultaneously forming the reduced portion of the second leg and a deformed region in the tail to capture the first leg in the tail.

18 Claims, 4 Drawing Sheets

METHOD AND APPARATUS FOR A CABLE CLAMP ASSEMBLY

BACKGROUND OF THE INVENTION

1. Field of the Invention

The invention relates to clamp assemblies for securing cables, wires or the like to structures, and more particularly to improved locking features for engaging a bail to the clamp assembly.

2. Description of the Prior Art

Various clamp assemblies are known for engaging and suspending a cable from a support but known designs suffer from problems such as unwanted disengagement of the clamp assembly from the support. Typically, the clamp assembly has a shell, a wedge or body member and a bail that forms a loop. The shell cooperates with the body member to grip and hold the cable. The loop-shaped bail connects to the body member to suspend the cable secured by the clamp to a support such as a ceramic insulator, hook or the like. The support can represent a point of termination such as pole, building or other locations for power cables or telephone lines, for example, from a general network to individual household known commonly as a drop wire.

While known clamp assemblies produce the desired result of gripping and holding the cable securely, an impact directed against the bail can cause unwanted disengagement of the bail from the body member, even after complete assembly, resulting in many practical difficulties during installation. For example, a worker installing cables or drop wires can perform this work at heights above the ground and may need to perform simultaneously several suspending operations. In order to suspend the cable from the support, the worker needs to pull the cable to the body member, while holding together this arrangement, insert and pull the shell into position, and then attach the bail around the support and to the body member. If the bail is bumped or otherwise impacted, the cable clamp assembly can disengage completely from the support taking the cable to the ground, and possibly placing the line installer into a dangerous or unsafe condition. Further, if the worker first assembles the bail around the support and to the body member, disengagement can distract the worker unduly while the worker is trying to hold the cable to the body member.

The clamp assembly can also be used in the nature of connecting conducting wires or cables thus increasing the need for safety features on clamp assemblies. At a minimum, the nuisance of reinstalling and securing the bail to the drop tends to increase the installation time and expense as well as causing other related problems. Therefore, an improved clamp assembly is needed to eliminate unwanted disengagements and the disadvantages of other known assemblies. Furthermore, a clamp assembly is needed with advantages such as low cost of manufacture, easier use and on-site installation.

The present invention is directed to a releasable bail as opposed to a fixed, closed-loop bail. Many bail configurations are available for installation on various type of hooks, eyes or the like. Typically, closed-loop bails are permanently secured to the body member during manufacture and can be made from hard wire such as aluminum as disclosed in U.S. Pat. Nos. 5,050,273; 4,939,821; 4,637,098; and 4,542,562; or from a stamped plate as disclosed in U.S. Pat. No. 4,592,117; or from a plastic composition as disclosed in U.S. Pat. No. 4,461,059 or the like. Normally closed-loop bails cannot be attached to a closed support such as ceramic insulators, eyelets or the like, and are generally hung from simple hook supports. However, some closed-loop designs allow for attachment to the closed support such as a nylon jacketed flexible wire or the hard wire bail disclosed in U.S. Pat. No. 5,050,273.

Known releasable bails provide an attached end and interlocking of the free bail end to the body member permitting manipulation by the worker to effect engagement or disengagement of a free end as is disclosed in U.S. Pat. Nos. 2,781,212 and 2,239,258. In U.S. Pat. No. 1,948,845 there is disclosed a bail with both free ends connected to the support or body member. Unlike the present invention, known releasable bails can become easily disengaged by an impact directed to the bail. In addition, these known releasable bails can be easily deformed during installation if the worker bends or distorts the bail when placing it around the support or when compressing the bail to attach a bail end to the body member. Deformation can result in a skewed bail-to-body member orientation or insufficient seating of the bail ends against the body member once assembled and can cause failures resulting in complete disengagement of the bail-to-body member attachment. The present invention eliminates these types of failures by providing improvements requiring less bail deformation to attach the bail to the structure and to the body member.

SUMMARY

Accordingly, it is an object of the present invention to provide a clamp assembly that overcomes many of the disadvantages of the prior art assemblies.

It is another object of the present invention to provide a cable clamp of a simple and easily operable construction being capable of restraining a cable by a clamping action.

It is another object of the invention to provide a clamp assembly with a locking structure to lock a releasable end of the bail for preventing unwanted disengagements. It is a feature of this locking structure that a free end of the bail is locked during installation rather than during manufacture. It is an advantage of the locking structure that a single-handed locking operation of the free end of the bail is provided to improve safety during installation at heights above the ground.

It is another object of the present invention to provide a clamp assembly having a first leg of the bail slideably attached and captured in a tail of the body member allowing axial-aligned movement of the bail. It is a feature of the axially-aligned sliding movement that a head and foot portion of a second leg of the bail slightly overlaps an entry portion of an aperture. The sliding feature permits the second leg to be connected to the tail with less deforming and bending of the bail.

It is an object of the present invention to provide a clamp assembly design for clamping a cable that minimizes failure of the bail-to-body member clamp connection.

Yet another object of the present invention is to provide improved methods for making and assembling cable clamp assemblies.

Briefly, in accordance with a preferred embodiment of the present invention, there is provided a clamp assembly utilizing a shell, a body member cooperating with the shell to grip the cable with the cable extending in an axial direction from one end of the body member, and a tail at the opposite end of the body member. A bail formed of resilient material with a relaxed U-shape has first and second legs. The first leg is attached to the tail using an attaching device. A releasable connecting device is used to connect the second leg to the tail that includes an aperture in the tail and cooperating lock structure on the second leg of the bail. The cable clamp assembly is characterized by the aperture with an entry portion, a lock portion smaller than the entry portion, and a connecting portion having a dimension smaller than the lock portion and extending from the entry portion to the lock portion. The lock structure includes a foot segment at the end of the second leg extending generally transverse to the axial direction. A head at the end of the foot segment is larger than the lock portion and smaller than the entry portion permitting the head to be inserted through the entry portion when the bail is resiliently compressed. The foot segment has a reduced portion spaced from the head fitting in the connecting portion and permitting the foot segment to pass along the connecting portion to locate the head at the lock portion. The foot segment between the reduced portion and the head is smaller than the lock portion and larger than the dimension of the connecting portion to retain the head at the lock portion when the bail is released.

In accordance with another feature of the present invention, the first leg is attached to the tail using an attaching device. The attaching device includes an interlocking structure located on the first leg and an aperture in the tail. The interlocking structure has a foot segment at the end of the first leg extending generally transverse to the axial direction and a knob at the end of the foot segment. The knob has a profile that is larger projected in the transverse direction than when projected in the axial direction. The aperture has a shape corresponding to the shape of the knob and foot segment profile projected in the axial direction so that the knob can be received in the aperture only when the first leg is oriented generally in the transverse direction. In an alternative arrangement, the tail can be deformed to capture the first leg within the aperture.

In accordance with an additional feature of the present invention, the first and second legs of the bail, each having foot segments and heads at the ends thereof, are of different lengths with a predetermined offset distance between the heads. The first leg is attached to the tail of the body member using an attaching device that provides a sliding engagement of the first leg captured in the tail of the body member. The second leg of the bail is attached by a releasable connecting device. A spaced relationship between the apertures of the attaching and releasable connecting devices and being is defined as the distance between the entry portion of the releasable connecting device and the shape corresponding to the profile of the head of the attaching device. The predetermined offset distance is substantially equal to the spaced relationship. The sliding attachment device positions the second leg to overlie the entry portion of the aperture of the releasable connecting means.

In accordance with a method of the present invention, the clamp assembly of the present invention can be manufactured by a process of assembling one of the foot segments to the tail placing the body member and the bail in a predetermined orientation. As one arrangement, the predetermined orientation can have the body member and the bail relatively end-to-end located in a longitudinal plane with the foot segment of the first leg located in the aperture. The body member and bail are held in the predetermined orientation. Then, the foot segment of the second leg and the tail are deformed simultaneously to form a reduced portion on the foot segment of the second leg and a deformed region at the location of the aperture and first leg. The deformed region closes the aperture over the foot segment capturing the foot segment of the first leg in the aperture.

The present invention also provides a method of assembling the clamp assembly to place the body member and the bail in a predetermined orientation and to assemble completely both legs to the tail. The foot segment with the knob extending generally traverse to the axial direction of the bail is inserted into an aperture formed in the tail. The aperture has a shape corresponding to the shape of the knob and foot segment viewed in the transverse direction so that the knob can be received in the other aperture only when the first leg is oriented generally in the transverse direction. The knob is larger viewed in the axial direction than when viewed in the transverse direction. The bail is rotated 180 degrees and then rotated 90 degrees to locate the knob substantially flush against the tail. The other leg is positioned such that the head and foot segment substantially overlaps another aperture formed in the tail.

BRIEF DESCRIPTION OF THE DRAWING

These and other objects and advantages of the present invention will appear from the following detailed description and attached drawing, wherein.

DETAILED DESCRIPTION OF THE PREFERRED EMBODIMENT

Figure 1:
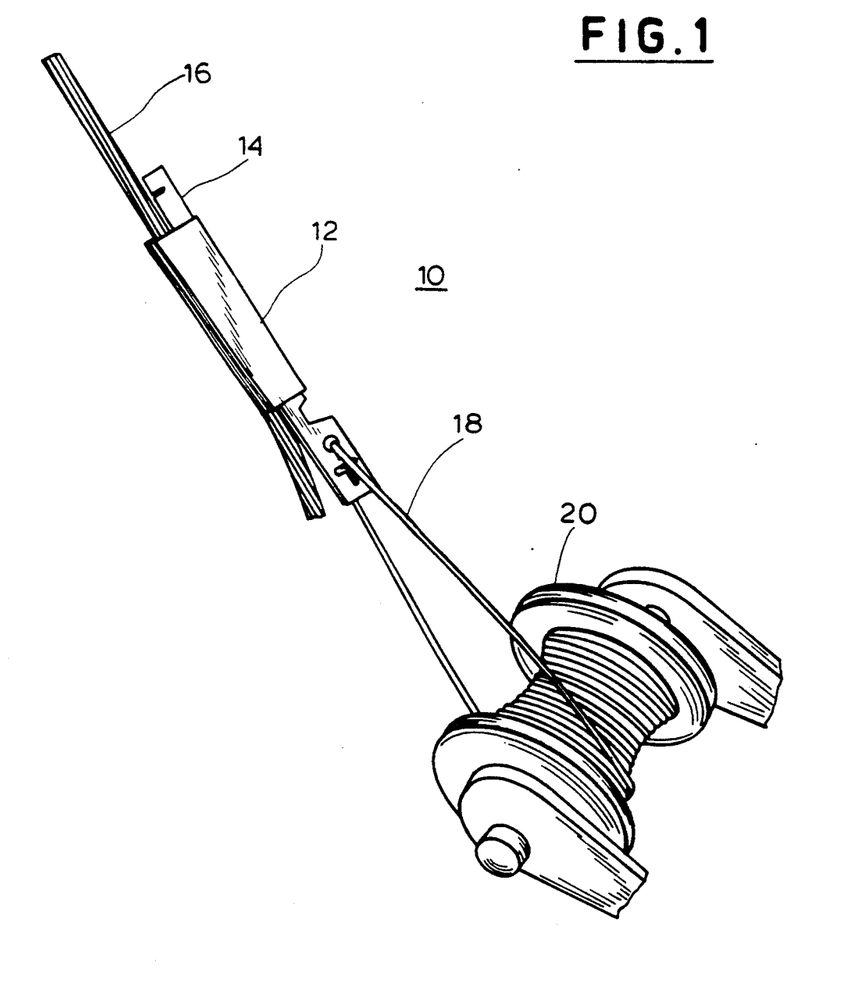
FIG. 1 is a perspective view of the clamp assembly of the present invention supporting a cable secured to a structure.
Figure 2:
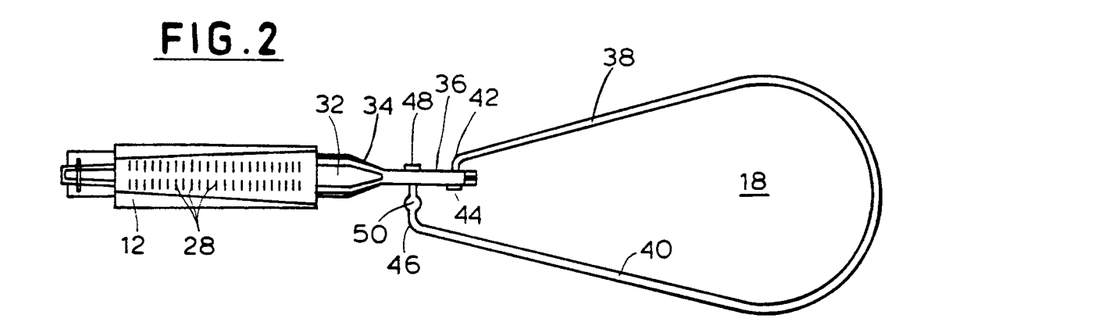
FIG. 2 is a top view of the clamp assembly.

Referring now to the drawings, in FIG. 1 there is illustrated a clamp assembly generally designated by the reference character 10 and constructed in accordance with the present invention. Among its primary components, the clamp assembly 10 includes a shell 12, a body member 14 cooperating with the shell 12 for gripping a cable or drop wire 16 with the shell 12 extending in an axial direction from one end of the body member 14, and a bail 18 attached to the body member 14 for suspending the cable 16 from a support 20. The shell 12 and body member 14 can be generally of a wedge-shape but the present invention is not limited to such because many types of shapes can be used to grip and secure the cable 16 to the clamp assembly 10. The present invention is directed to improved engagement devices and methods for the connection between the body member 14 and the bail 18.

As illustrated in FIGS. 2-5, the shell 12 is generally U-shaped in cross section so as cradle the cable 16 therein. The shell 12 is provided with flanges 22 and rails 24 at the ends of the flanges 22 to slideably engage edges 26 of the body member 14. The shell 12 can have a plurality of serrations or teeth 28 for positively gripping the cable 16. The wedge-shaped body member 14 cooperating with the shell 12 can provide increased gripping and holding force under tension, and under certain applications the serrations 28 can be eliminated so as to reduce damage, for example, to an insulated drop wire. The shell 12 can have a lip 30 at each end to reduce further damage to the cable 16 when suspended and under tension as illustrated in FIG. 1.

The body member 14 is provided with a neck portion 34 and a tail 36 for engaging the bail 18. The body member 14 is provided with a concave gripping portion 32 (FIG. 5) which assists in maintaining the cable 16 in a centered position and provides a greater gripping area. The shell 12 and body member 14 can have different constructions as desired for a particular application such as for various strength requirements and environmental conditions. For example, the shell 12 and body member 14 can be formed by a stamping process and made of sheet metal such as from aluminum for normal strength requirements and for use in highly corrosive environmental conditions, or made from stainless steel for use under high strength conditions.

In use, the shell 12 and body member 14 are initially in a longitudinally offset position, on opposite sides of the cable 16. The cable 16 is held to the body member 14 in the concave gripping portion 32 while the shell 12 is slideably engaged and passed over the neck portion 34 into a gripping relationship with the cable 16. The tension of the suspended cable 16 tends to pull the shell 12 in one direction, and the tension of the bail 18 attached to the tail 36 tends to draw the body member 14 in the opposite direction, thereby causing the cable 16 to be tightly gripped.

Referring now to FIGS. 2-4, and 8, the preformed loop of the bail 18 is generally U-shaped with first and second legs 38 and 40, respectively, that are attached to the tail 36. The first leg 38 is shorter in the axial direction than the second leg 40, and is provided with a bent portion forming a foot segment 42 and with a knob 44 at the end thereof. The second leg 40 has another foot segment 46 and head 48 at the end, having additionally a reduced portion 50 of reduced thickness formed between the bend of the foot segment 46 and the head 48. The reduced portion 50 can be of a lesser diameter or can be a flattened shape formed by the process described below.

The foot segments 42 and 46 extend in opposite directions and generally transverse to the axial direction of the bail 18 and tail 36. Because the first leg 38 is shorter than the second leg 40, a predetermined offset 72 (FIG. 8) is present between the ends. Other bail configurations in various bail o diameters may be used for various types of supports 20 such as hooks, eyes, etc. Furthermore, the radius of the loop of the bail 18 can conform to the surface shape of the support 20 such as a ceramic insulator or any other support 20 to which the bail attached. Typically, the bail 18 can have a hard wire metal construction such as, for example, aluminum as desired for strength or environmental requirements of a particular application.

Figure 4:
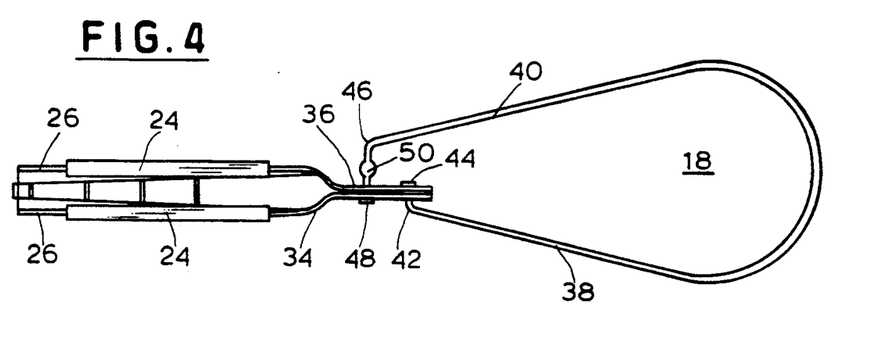
FIG. 4 is a bottom view of the clamp assembly.
Figure 6:
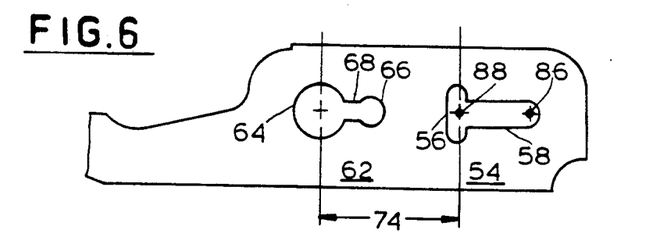
FIG. 6 illustrates an embodiment of the present invention for attaching and locking the first leg to the tail and for releasably connecting and locking the second leg to the tail.
Figure 9A:
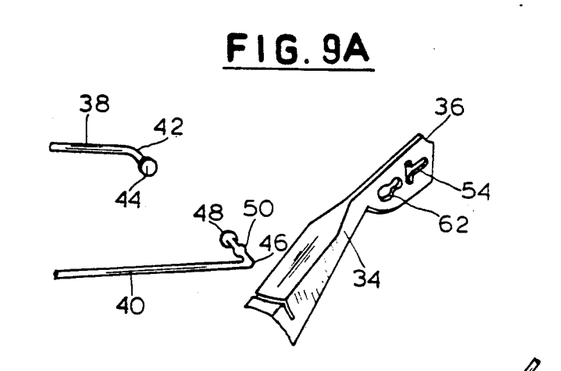
FIGS. 9A, 9B, 9C, 9D, and 9E illustrate the steps of a method of attaching the bail to the tail of the cable clamp in accordance with the present invention.
Figure 9B:
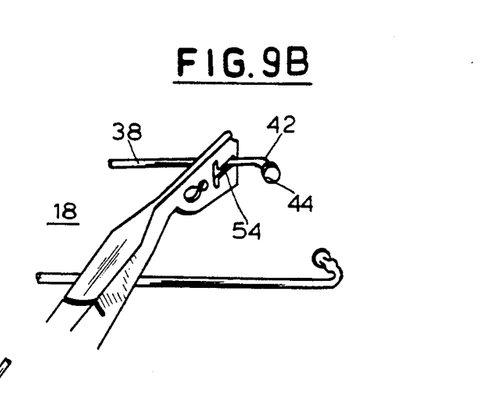

As illustrated in FIGS. 4 and 6, the tail 36 is formed at the end of the body member 14 opposite the end having the cable 16 extending therefrom. The tail 36 is in the form of a fold of the web portion of the body member 14 with two openings formed therein. The first opening is an aperture 54 for attaching the foot segment 42 of the first leg 38 to the tail 36. The aperture 54 is generally of a keyhole shape with a relatively larger portion 56 and a relatively smaller portion 58. The aperture 54 has a shape corresponding to the shape of the knob 44 and foot segment 42 as viewed in a direction transverse to the axis of the foot segment 42 so that the knob 44 can be inserted and received in the aperture 54 only when the first leg 38 is oriented generally in the transverse direction (FIGS. 9A and 9B). The aperture 54 can be made in a T-shape with the larger portion 56 placed orthoganal to the smaller portion 58. In addition, the relatively larger portion 56 is oriented closer to the end of the body member 14 having the cable 16 extending therefrom. However, this orientation can be rearranged in order to accomplish the equivalent function of attaching the first leg 38 to the aperture 54.

As shown in FIG. 6, the second opening includes another aperture 62 in the form of an entry portion 64 connected to a lock portion 66 by a slot or connecting portion 68. The entry portion 64 is larger than the lock portion 66 and is large enough to receive the head 48. The lock portion 66 is smaller than the head 48 yet large enough to retain the foot segment 46. The connecting portion 68 is narrower than the lock portion 66 and is sized to receive the reduced portion 50. A worker installing a cable 16 to the clamp assembly 10 can compress the bail 18 to insert the head 48 into the entry portion 64 and locate the reduced portion 50 of the foot segment 46 at the connecting portion 68. The reduced portion 50 can now be passed along the connecting portion 68 to locate the head 48 at the lock portion 66. When the bail springs back, the foot segment 46 and head 48 are locked in the aperture 62.

Figure 8:
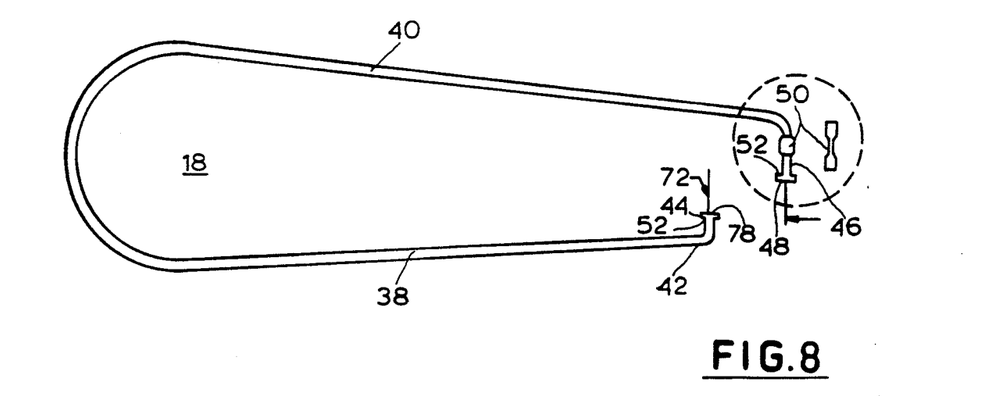
FIG. 8 is a top view of a bail.

In operation, as shown in FIGS. 6 and 8, the smaller portion 58 of aperture 54 provides a sliding attachment for the attached foot segment 42 and knob 44. In conjunction with a spaced relationship 74 between the entry portion 64 and the lock portion 66, the offset 72 can slideably reposition the head 48 of the second leg 40 along the axis of body member 14. For example, the attached foot segment 42 can be freely repositioned from an aft end 86 to a fore end 88 of the smaller portion 58. Likewise, the head 48 at the end of foot segment 46 can be repositioned over the aperture 62 because of the offset 72. By sliding bail 18 axially along the smaller portion 58, the head 48 is moved or adjusted to the entry portion 64 from the lock portion 66 with less compression and deformation of the bail 18. The offset 72 between the knob 44 and head 48 can be made so that the head 48 will substantially overlie the entry portion 64 with the knob 44 located at the fore end 88 by mostly sliding action and less compression action. Because deformation of the bail 18 is minimized, the knob 44 and head 48 are retained flush to the tail 36 with the bail 18 retaining the shape formed at manufacture. Reducing the deformation of the bail 18 increases the likelihood that the connection between the bail 18 and body member 14 is completed properly thus reducing failures of the clamp assembly 10 such as by stripping the connecting portion 68 to render the clamp assembly 10 inoperable.

Referring now to FIG. 8, the knob 44 and head 48 at the end of the foot segments 42 and 46 are a rounded shape when axially viewed, and when viewed in the transverse direction, each has flat surface forming a base 52 and top 78 to provide a flush relationship between the base 52 and the tail 36. The knob 44 and the head 48 can be formed of the same shape or of different shapes as desired for a particular application. As discussed above, the foot segment 42 and knob 44 produce a shape corresponding to the shape of aperture 54. It is contemplated that the knob 44 can be formed of different shapes such as but not limited to a rounded or crown top with the base 52. Thus, many shapes for the foot segment 42 and knob 44 corresponding to the combined shape or profile of the larger and smaller portions 56 and 58 of the aperture 54 will work using this feature. While many possible shapes are contemplated, the ultimate shape is chosen to perform under the stresses exerted at the larger and smaller portions 54 and 56 while the clamp assembly 10 is under tension.

Figure 9C:
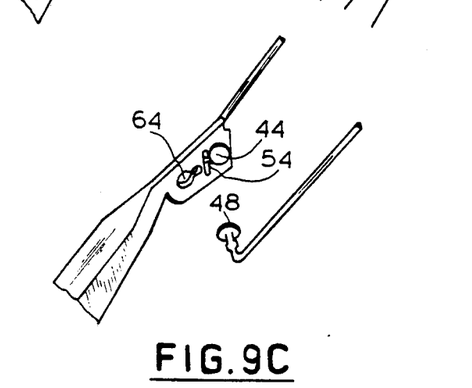

As illustrated in FIGS. 9A, 9B, 9C, 9D and 9E, the process of assembling embodiment of the invention seen in FIGS. 1-6 and 8 is described. The aperture 54 has a shape corresponding to the shape of the knob 44 and foot segment 42 as viewed in the transverse direction. The knob 44 can be inserted and received in the aperture 54 only when the first leg 38 is oriented generally in the transverse direction as shown in FIG. 9A. Once the foot segment 42 and knob 44 are inserted into the aperture 54, as shown in FIG. 9B, the bail 18 is axially rotated 180 degrees around the longitudinal axis of the first leg 38, and then 90 degrees in the lateral plane of the clamp assembly 10 to attach the knob 44 in the aperture 54, as shown in FIG. 9C. As discussed above, the sliding engagement feature can be used to locate the head 48 at the entry portion 64 to facilitate insertion therein.

Figure 9D:
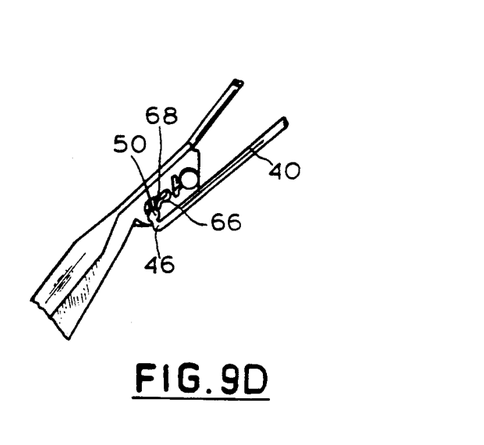
Figure 9E:
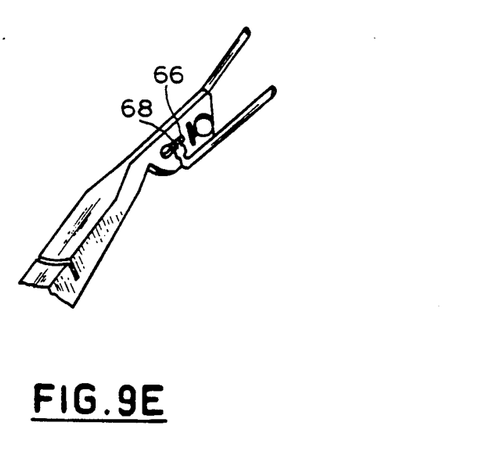

The bail 18 can be resiliently compressed to insert the head 48 into the entry portion 64 of the aperture 62 as shown in FIG. 9D. The compression of the bail 18 locates the reduced portion 50 of the foot segment 46 at the connecting portion 68 where the reduced portion 50 can be passed along connecting portion 68 to locate the head 48 at the lock portion 66. The diameter of the foot segment 46 between the reduced portion 50 and the head 48 is smaller than the lock portion 66 and larger than the dimension of the connecting portion 68 providing a locking mechanism 70 that retains the base 52 and head 48 at the lock portion 66 when the bail 18 is released, as is shown in FIG. 9E. The locking mechanism 70 allows for one-handed locking operation by the worker performing suspension work at heights above the ground and reduces unwanted disengagements such as caused by an impact directed against the bail 18. Also, the locking mechanism 70 substantially reduces inadvertent widening of the slot 68 which can cause failure of the bail-to-body member connection.

Figure 7A:
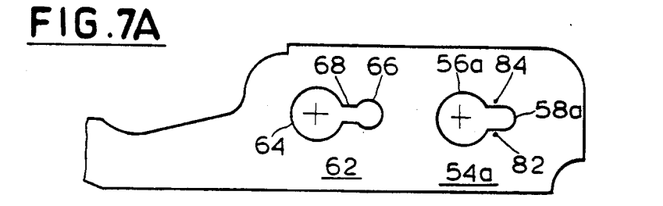
FIGS. 7A and 7B illustrate an additional embodiment for the first leg to the bail.
Figure 7B:
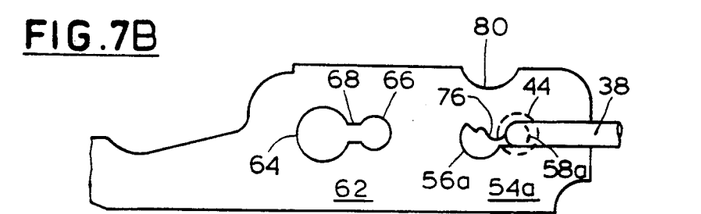

As illustrated in FIGS. 7A and 7B, an additional embodiment for attaching the first leg 38 to the tail 36 is described. The aperture 54a can be made in a keyhole shape with a larger portion 56a and a smaller portion 58a. The larger portion 56a has a larger diameter than the diameter of the smaller portion 58a. The aperture 62 is described above. The foot segment 42 and knob 44 are assembled to the aperture 54a, being inserted into the larger portion 56a and located at the small portion 58a. Then, the material of the aperture 54a is deformed forming a deformed region 76 which closes the aperture 54a over the foot segment 42 of the first leg 38. The deformed region 76 can be made by using a known process such as by staking which involves striking and deforming the upper tail surface 80 of the tail 36 or by striking points 82 and 84 to pinch closed the smaller portion 58a.

Figures 3, 5:
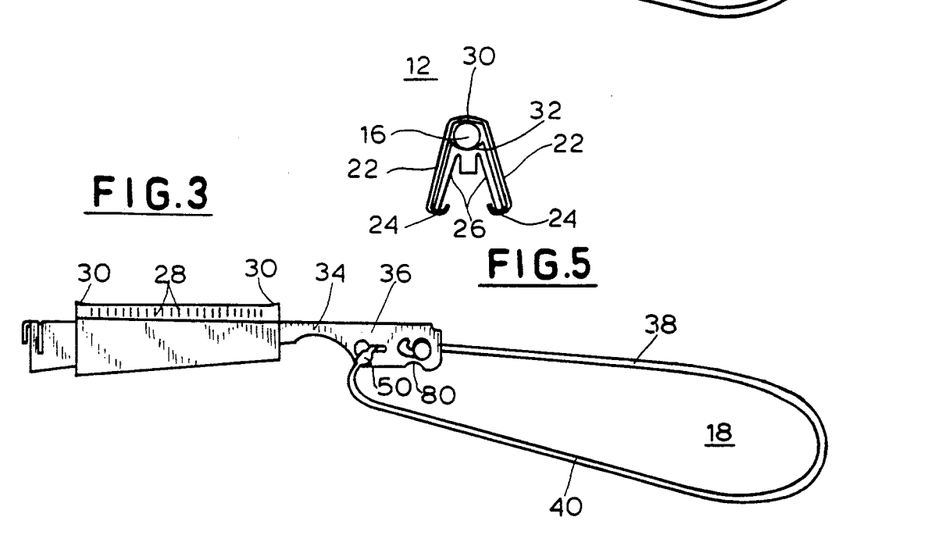
FIG. 3 is a side view of the clamp assembly illustrating a staked attachment of a leg to the tail.
FIG. 5 is a rear view of the clamp assembly.

Referring now to FIGS. 3, 7A and 7B, a method of making the clamp assembly 10 using a process that forms the deformed region 76 and the reduced portion 50 simultaneously is described. The foot segment 42 and knob 44 are assembled to the aperture 54a, being inserted into the larger portion 56a and located at the smaller portion 58a. The bail 18 can be positioned and held in an end-to-end orientation relative with the body member 14. Both the reduced portion 50 (FIG. 8) of the foot segment 46 and the deformed region 76 (FIG. 7B) are deformed simultaneously by one stroke of a staking tool. The deformed region 76 serves to close the aperture 54a over the foot segment 42 of the first leg 38 located therein. Here, the reduced portion 50 is a flattened diameter of the bail 18 being a dimension that is less than the dimension of the connecting portion 68 to permit the reduced portion of the foot segment to pass along the connecting portion 68 to locate the head 48 at the lock portion 66.

Many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A cable clamp assembly comprising:
   a shell;
   a body member cooperating with said shell to grip the cable with the cable extending in an axial direction from one end of said body member;
   a tail at the opposite end of said body member;
   a bail formed of resilient material having a relaxed U-shape including first and second legs;
   means for attaching said first leg to said tail; and
   means for releasably connecting said second leg to said tail including an aperture in said tail and cooperating lock structure on said second leg of said bail;
   said cable clamp assembly being characterized by:
   said aperture including an entry portion, a lock portion smaller than said entry portion and a connecting portion having a dimension smaller than said lock portion and extending from said entry portion to said lock portion;
   said lock structure including a foot segment at the end of said second leg extending generally transverse to said axial direction;
   a head at the end of said foot segment larger than said lock portion and smaller than said entry portion permitting said head to be inserted through said entry portion when said bail is resiliently compressed;
   said foot segment having a reduced portion spaced from said head fitting in said connecting portion permitting said foot segment to pass along said connecting portion to locate said head at said lock portion; and
   said foot segment between said reduced portion and said head being smaller than said lock portion and larger than said dimension of said connecting portion to retain said head at said lock portion when the bail is released;
   wherein said attaching means comprises:

another aperture in said tail having a relatively larger portion and a relatively smaller portion; and another foot segment at the end of said first leg extending generally transverse to said axial direction;

said other foot segment having another head at the end of said other foot segment and being permitted to move within said relatively smaller and larger portions of said other aperture in the same direction as said foot segment moves within said aperture in order to permit said head of said foot segment to be inserted through said entry portion and to be located at said lock portion.

2. The cable clamp assembly of claim 1 wherein said foot segments extend generally in opposite directions.

3. The cable clamp assembly of claim 1 wherein said other head of said other foot segment includes an enlarged knob adapted to be captured in said other aperture.

4. The cable clamp assembly of claim 3 wherein said knob is larger viewed in said transverse direction than when viewed in said axial direction, and said other aperture has a shape corresponding to the shape of said knob and other foot segment viewed in said axial direction so that said knob can be received in said other aperture only when said first leg is oriented generally in said transverse direction.

5. The cable clamp assembly of claim 4 wherein said relatively larger portion of said other aperture is closer to said one end of said body member than said relatively smaller portion.

6. The cable clamp assembly of claim 1, wherein the body member is formed in the shape of a wedge.

7. A cable clamp assembly comprising:
a shell;
a body member cooperating with said shell to grip the cable with the cable extending in an axial direction from one end of said body member;
a tail at the opposite end of said body member;
a bail formed of resilient material having a relaxes U-shape including first and second legs;
means for attaching said first leg to said tail; and
means for releasably connecting said second leg to said tail including an aperture in said tail and cooperating lock structure on said second leg of said bail;
said cable clamp assembly being characterized by:
said aperture including an entry portion, a lock portion smaller than said entry portion and a connecting portion having a dimension smaller than said lock portion and extending from said entry portion to said lock portion;
said lock structure including a foot segment at the end of said second leg extending generally transverse to said axial direction;
a head at the end of said foot segment larger than said lock portion and smaller than said entry portion permitting said head to be inserted through said entry portion when said bail is resiliently compressed;
said foot segment having a reduced portion spaced from said head fitting in said connecting portion permitting said foot segment to pass along said connecting portion to locate said head at said lock portion;
said foot segment between said reduced portion and said head being smaller than said lock portion and larger than said dimension of said connecting portion to retain said head at said lock portion when the bail is released;

wherein said attaching means comprises;
another aperture in said tail;
another foot segment at the end of said first leg extending generally transverse to said axial direction; and
said other foot segment being engaged with said other aperture; and
wherein said tail has a deformed region at the location of said other aperture serving to close said other aperture over said other foot segment in order to capture said other foot segment in said aperture.

8. The cable clamp assembly of claim 7 wherein said other aperture is generally of a keyhole shape with a relatively larger portion and a relatively smaller portion and said tail has a deformed region at the location of said other aperture serving to close said other aperture over said other foot segment in order to capture said other foot segment in said other aperture.

9. The cable clamp assembly of claim 8 wherein said reduced portion of said foot segment of said second leg and said deformed region of said tail are made by a process including simultaneously deforming said foot segment of said second leg and said deformed region of said tail.

10. The cable clamp assembly of claim 8 wherein said deformed region is at the junction of said relatively larger and relatively smaller portions of said other aperture.

11. A cable clamp assembly comprising:
a shell;
a body member cooperating with said shell to grip the cable with the cable extending in an axial direction from one end of said body member;
a tail at the opposite end of said body member;
a bail formed of resilient material having a relaxed U-shape including first and second legs;
means for attaching said first leg to said tail including an aperture in said tail and interlocking means located on said first leg; and
means for releasably connecting said second leg to said tail;
said cable clamp assembly being characterized by:
said interlocking means including a foot segment at the end of said first leg extending generally transverse to said axial direction and a knob at the end of said foot segment, said knob having a profile that is larger projected in said transverse direction than when projected in said axial direction; and
said aperture has a shape generally of a keyhole shape with a relatively larger portion and a relatively smaller portion and corresponding to the shape of said knob and foot segment profile projected in said axial direction so that said knob can be received in said aperture only when said first leg is oriented generally in said transverse direction and so that said foot segment is permitted to move within said aperture;
wherein said connecting means comprises:
another aperture in said tail, said other aperture including an entry portion, a lock portion smaller than said entry portion, and a connecting portion having a dimension smaller than said lock portion and extending from said entry portion to said lock portion;
a lock structure including another foot segment at the end of said second leg extending generally transverse to said axial direction;

a head at the end of said other foot segment larger than said lock portion and smaller than said entry portion permitting said other head to be inserted through said entry portion when said bail is resiliently compressed;

said other foot segment having a reduced portion spaced from said head fitting in said connecting portion permitting said other foot segment to pass along said connecting portion as said foot segment moves in the same direction within said aperture to locate said other head at said lock portion; and said other foot segment between said reduced portion and said head being smaller than said lock portion and larger than said dimension of said connecting portion to retain said head at said lock portion when the bail is released.

12. The cable clamp assembly of claim 11 wherein said interlocking means has said knob of said foot segment captured in said aperture.

13. The cable clamp assembly of claim 11 wherein said aperture and said interlocking means as viewed in said axial direction is generally a T-shape.

14. The cable clamp assembly of claim 11 wherein said relatively larger portion of said aperture is closer to said one end of said body member than said relatively smaller portion.

15. A process of manufacturing a cable clamp assembly having a shell, a body member including a tail portion with dual apertures, and a bail having a relaxed U-shape including first and second legs with foot segments at the end of said legs extending generally transverse to said axial direction and in opposite directions and with heads at the end of each foot segment, said process comprising the steps of:

assembling one of said foot segments to said tail in a predetermined orientation of said body member and said bail, said predetermined orientation having said body member and said bail relatively end-to-end in a longitudinal plane with said foot segment located in said aperture;

holding said body member and said bail in said predetermined orientation; and deforming simultaneously said foot segment of said second leg forming a reduced portion and said tail forming a deformed region at the location of said aperture serving to close said aperture over said foot segment in order to capture said foot segment of said first leg in said aperture.

16. A cable clamp assembly made by the process of claim 15.

17. A process of assembling a bail to a cable clamp, wherein the bail has a relaxed U-shape with two legs, and the cable clamp comprising a shell cooperating with a body member to grip the cable with the cable extending in an axial direction from one end of the wedge member, and a tail at the opposite end of the wedge member for attaching to the bail, said process comprising the steps of:

inserting one leg with a foot segment and a knob at the end extending generally traverse to an axial direction of the bail into an aperture formed in the tail, wherein said knob is larger viewed in said transverse direction than when viewed in said axial direction, and said aperture has a shape corresponding to the shape of said knob and foot segment viewed in said axial direction so that said knob can be received in said other aperture only when said first leg is oriented generally in said transverse direction;

rotating the bail 180 degrees;

rotating the bail 90 degrees locating the knob substantially flush against the tail and locating the other leg substantially overlapping another aperture in the tail;

inserting a head and another foot segment located on at the end of the other leg of the bail through an entry portion of said other aperture when said bail is resiliently compressed, said other aperture further including a lock portion smaller than said entry portion and a connecting portion having a dimension smaller than said lock portion and extending from said entry portion to said lock portion; and passing a reduced portion on said other foot segment spaced from said head along said connecting portion as said foot segment is moved in the same direction along said aperture permitting said other foot segment to pass through said connecting portion and locating said head at said lock portion, wherein said other foot segment between said reduced portion and said head being smaller than said lock portion and larger than said dimension of said connecting portion to retain said head at said lock portion when the bail is released.

18. A cable clamp comprising:

a shell;

a body member cooperating with said shell to grip the cable with the cable extending in an axial direction from one end of the wedge member;

a tail at the opposite end of said wedge member;

a bail formed of resilient material having a relaxed U-shape including first and second legs, said first and second legs each having foot segments and head at the end thereof, said first and second legs being of different lengths with a predetermined offset distance between said heads;

means for attaching said first leg to said tail including an aperture and interlocking means located on said first leg, said aperture having a shape corresponding to the shape of said head and foot segment on said first leg viewed in said transverse direction so that said head can be received in said aperture only when said first leg is oriented generally in said transverse direction, and said attaching means providing a sliding attachment of aid head in said aperture;

means for releasably connecting said second leg to said tail including another aperture in said tail and cooperating lock structure on said second leg, said other aperture including an entry portion, a lock portion smaller than said entry portion and a connecting portion having a dimension smaller than said lock portion and extending from said entry portion to said lock portion; and said predetermined offset distance between said heads is substantially equal to a spaced relationship between the shape corresponding to said head of said aperture and aid entry portion of said other aperture, wherein said sliding attachment permits the repositioning of the head of said second leg to the entry portion from said lock portion of the releasable connecting means as said foot segment of said first leg moves within said aperture in the same direction.

* * * * *